(12) United States Patent
Wollny et al.

(10) Patent No.: US 7,295,205 B2
(45) Date of Patent: Nov. 13, 2007

(54) METHOD AND SYSTEM FOR OPTIMIZING A FINITE ELEMENT MESH

(75) Inventors: Martin R. Wollny, Dearborn, MI (US); Paul Richard Kinney, Westland, MI (US)

(73) Assignee: Ford Motor Company, Dearborn, MI (US)

( * ) Notice: Subject to any disclaimer, the term of this patent is extended or adjusted under 35 U.S.C. 154(b) by 48 days.

(21) Appl. No.: 11/242,690

(22) Filed: Oct. 4, 2005

(65) Prior Publication Data

US 2006/0028467 A1 Feb. 9, 2006

Related U.S. Application Data

(63) Continuation of application No. 10/248,115, filed on Dec. 19, 2002, now Pat. No. 6,970,165.

(51) Int. Cl.
  *G06T 15/00* (2006.01)
(52) U.S. Cl. ............... 345/423; 345/419; 345/426
(58) Field of Classification Search ............ 345/419, 345/423, 428, 581, 619, 441, 426, 589
  See application file for complete search history.

(56) References Cited

U.S. PATENT DOCUMENTS

| | | | | |
|---|---|---|---|---|
| 4,941,114 A | 7/1990 | Shigyo et al. | ............ | 364/578 |
| 5,214,752 A | 5/1993 | Meshkat et al. | ............ | 395/123 |
| 5,542,030 A | 7/1996 | Gutfinger | ............ | 345/423 |
| 5,740,342 A | 4/1998 | Kocberber | ............ | 345/420 |
| 5,774,124 A | 6/1998 | Itoh et al. | ............ | 345/423 |
| 5,774,696 A | 6/1998 | Akiyama | ............ | 395/500 |
| 6,121,973 A | 9/2000 | Itoh et al. | ............ | 345/423 |
| 6,124,857 A | 9/2000 | Itoh et al. | ............ | 345/423 |
| 6,192,293 B1 | 2/2001 | Yamada et al. | ............ | 700/182 |
| 6,226,405 B1 | 5/2001 | Furuhata et al. | ............ | 382/197 |
| 6,252,601 B1 | 6/2001 | Tanaka | ............ | 345/423 |
| 6,259,453 B1 | 7/2001 | Itoh et al. | ............ | 345/423 |
| 6,271,861 B1 * | 8/2001 | Sargent et al. | ............ | 345/589 |

(Continued)

OTHER PUBLICATIONS

Article entitled, "CUBIT Mesh Generation Research Project" (http://www.cs.sandia.gov/CRF/cub_p2.html), Jan. 18, 1995.

(Continued)

*Primary Examiner*—Phu K. Nguyen
(74) *Attorney, Agent, or Firm*—Gary Smith; Brooks Kushman P.C.

(57) ABSTRACT

Computer-implemented method and system for optimizing a finite element mesh. Computing devices are configured to calculate a quality score for at least one original element in a finite element mesh based upon two or more quality attributes simultaneously. A quality score for at least one substitute element for the original element is calculated based upon the two or more quality attributes. If one or more substitute element(s) have a quality score that is better than the quality score of the original element(s), the original element(s) is/are replaced with the substitute element(s) having the best quality score. A quality score may be calculated for each of a plurality of combinations of one or more substitute elements. Input may be provided specifying at least one quality threshold value for comparing the two or more element quality parameters (skew, warp, aspect ratio, etc.).

2 Claims, 7 Drawing Sheets

U.S. PATENT DOCUMENTS

| | | | |
|---|---|---|---|
| 6,587,105 B1 * | 7/2003 | Stam | 345/423 |
| 6,600,488 B1 * | 7/2003 | Moreton et al. | 345/423 |
| 6,611,267 B2 | 8/2003 | Migdal et al. | 345/428 |
| 6,784,896 B1 * | 8/2004 | Perani et al. | 345/589 |
| 7,023,435 B1 * | 4/2006 | Litke et al. | 345/420 |

OTHER PUBLICATIONS

Kinney, Paul, Paper entitled, "CleanUp: Improving Quadrilateral Finite Element Meshes", (Ford Motor Co., Dearborn, Michigan), proceedings, 6$^{th}$ Int'l meshing Roundtable, Sandia National Laboratory, pp. 449-461, Oct. 1997.

* cited by examiner

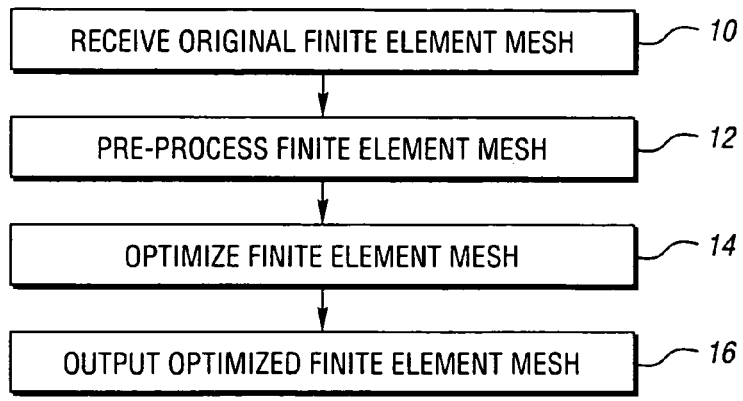
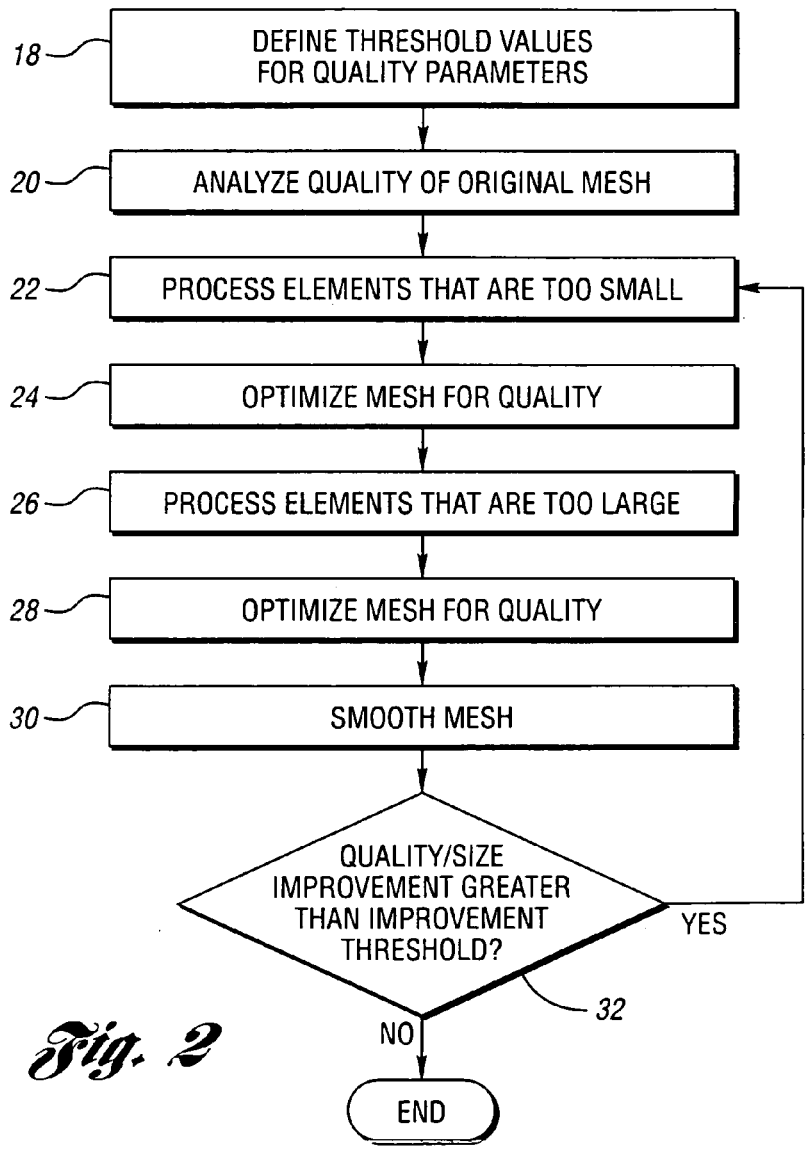

$$\text{aspect-ratio} = \frac{l}{\min(h1, h2)}$$

$$\text{aspect-ratio} = \frac{s}{h}$$

$$a_{min} = \min(a_1, a_2, a_3)$$

$$\text{taper} = \left(\frac{a_{min}}{(a_1, a_2, a_3)}\right) \times 0.75$$

cp = center point of inscribed circle
$a_1, a_2, a_3$ = area between cp and 2 edge points

| | | Quality Values and Types | | |
|---|---|---|---|---|
| | | Type | Good | Bad |
| Warping | Quad | Standard | 3.00 | 15.00 |
| Skewing | Tria | Interior Angle | 31.50 | 62.50 |
| | Quad | Interior Angle | 17.50 | 47.50 |
| Aspect Ratio | Tria | Rock | 4.00 | 10.00 |
| | Quad | Perpendicular | 4.00 | 10.00 |
| Taper | Tria | Switch_off | 0.22 | 0.12 |
| | Quad | Switch_off | 0.22 | 0.12 |
| Distortion | Tria | Switch_off | 0.35 | 0.25 |
| | Quad | Switch_off | 0.35 | 0.25 |

Apply   Dismiss   Help

*Fig. 6*

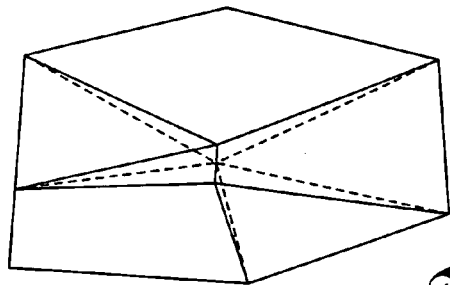
| ——— | ORIGINAL ELEMENT PATTERN |
| ----- | REPLACEMENT ELEMENT PATTERN |
Fig. 8
Tria - cutting one long side
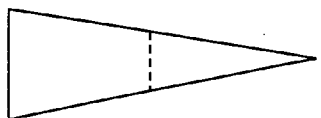
Tria - two long sides
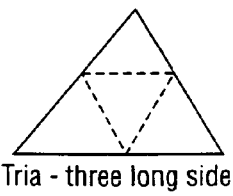
Tria - three long sides
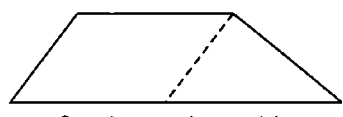
Quad - one long side
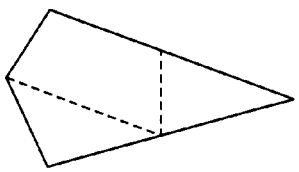
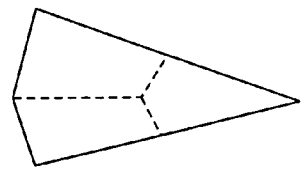
Quad - two adjacent long sides
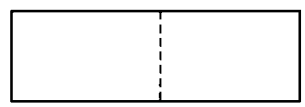
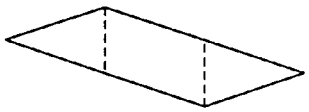
Quad - two opposite long sides
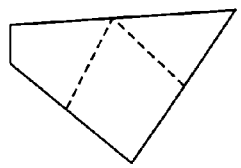
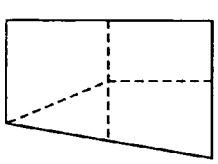
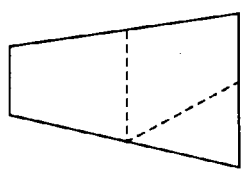
Quad - three long sides
Quad - four long sides
| ——— | ORIGINAL ELEMENT PATTERN |
| ----- | REPLACEMENT ELEMENT PATTERN |
Fig. 9

METHOD AND SYSTEM FOR OPTIMIZING A FINITE ELEMENT MESH

CROSS-REFERENCE TO RELATED APPLICATIONS

This application is a continuation of U.S. application Ser. No. 10/248,115 filed Dec. 19, 2002 now U.S. Pat. No. 6,970,165.

BACKGROUND OF THE INVENTION

1. Field of the Invention

The present invention relates generally to methods and systems for cleaning or otherwise enhancing the quality of finite element meshes.

2. Background Art

One method for cleaning a finite element mesh is known as the paver cleanup method developed at Sandia National Laboratories. This method focuses on the valence of finite element mesh elements—the number of element edges that include a node or the number of mesh elements around a node. Because the paver mesh comprises all quad elements, the goal of the cleanup algorithm is to generate as many nodes as possible having a valence of 4.

The first step in the paver cleanup method is, for each node in the mesh, to compute the node valence and the valence of all nodes in the ring around it. This series of numbers is searched through a library of approximately 150 known patterns. When a match is found, encoded instructions associated with the matching pattern specify a change in the mesh to reduce the number of nodes that do not have a valence of 4. The changed modes are then smoothed.

The second step involves smoothing the entire mesh. The third step involves, for each element in the mesh, measuring the angles of each element. If angle any is extreme, an edge is rotated with a neighbor element. In other words, elements on either side of an edge are removed and replaced with two new elements with a different edge position.

Although the paver cleanup method may be effective at controlling/correcting node valence, the method does not necessarily generate elements having a better overall quality. The present invention is an alternative to the paver and other prior art methodologies for cleaning or otherwise optimizing finite element meshes.

SUMMARY OF THE INVENTION

One advantage of the present invention is the ability to evaluate and optimize one or more mesh elements based on two or more quality attributes simultaneously. Unlike prior art methodologies for optimizing finite element meshes, the present invention better ensures that a resulting mesh has an overall quality that is better than the original mesh.

Another advantage of the present invention is the ability to consider an overall quality score for more than one possible substitute element in the optimization process. This is advantageous because the consideration of multiple potential substitute elements may yield a higher overall substitute element quality than prior art methodologies only configured for considering a single substitute element.

These advantages and other objects and advantages of the present invention may be realized utilizing a computer-implemented method and system comprising one or more computing devices configured to receive a first finite element mesh in an electronic format, calculate a quality score for at least one original element in the finite element mesh wherein the quality score is based upon two or more quality attributes, calculate a quality score for at least one substitute element for the original element wherein the quality score is based upon the two or more quality attributes, and if one or more substitute element(s) have a quality score that is better than the quality score of the original element(s), replace the original element(s) with the substitute element(s) having the best quality score. Additionally, a quality score may be calculated for each of a plurality of combinations of one or more substitute elements.

Other embodiments of the present invention include a computer-implemented method and system for replacing certain elements in a finite element mesh to improve the quality of the mesh. These embodiments involve a computing device configured for receiving a finite element mesh in electronic format, for receiving input specifying at least one quality threshold value for two or more element quality parameters, calculating a quality score for at least one element within the finite element mesh to identify at least one element whose quality score does not meet the quality threshold values for the two or more element quality parameters, creating at least one substitute element for the at least one element whose quality score does not meet the quality threshold values, calculating a quality score for each of the substitute elements; and, if any of the substitute elements have a better quality score than the elements whose quality score does not meet the quality threshold values, replacing elements whose quality score does not meet the quality threshold value with the substitute element(s) having the best quality score.

Quality thresholds may include a range of values for identifying a number of failing, acceptable and/or good element patterns within the finite element mesh. An overall quality score may be calculated for all element patterns within the finite element mesh. The overall quality grade for the finite element mesh may be based upon the quality scores of the elements that make up the finite element mesh. Element quality parameters include parameters such as shape, warp, skew, aspect ratio, taper, distortion, etc.

A method for calculating an aspect ratio quality value for a quad element in a finite element mesh is also provided. The method includes summing the lengths of opposite sides of a quad element and dividing the larger sum by the smaller sum. Another method for calculating an aspect ratio quality value for a quad element in a finite element mesh includes dividing the length of the longest side of the quad element into the length of the shortest perpendicular of the quad.

A method for calculating an aspect ratio quality value for a tria element is also provided. This method includes dividing the tria's height into the length of the longest side of the tria.

A method for calculating a taper quality value for a tria element in a finite element mesh is also provided. The method includes inscribing a circle within the tria such that three sides of the tria are tangent to the circle, drawing a line from the center of the circle to each of the three tria nodes dividing the element into three parts, calculating the area of the tria and the area of each of the three parts, dividing the smallest area into the area of the tria, and multiplying the result by a constant.

The above objects, features, and advantages of the present invention are readily apparent from the following detailed description of the preferred embodiments of the invention when taken in connection with the accompanying drawings.

BRIEF DESCRIPTION OF THE DRAWINGS

FIG. 1 is a block flow diagram illustrating a preferred methodology for implementing the present invention;

FIG. 2 is a block flow diagram illustrating an overview of a preferred methodology for optimizing a finite element mesh in accordance with the present invention;

FIG. 6 is an example graphical user interface (GUI) for receiving input defining mesh quality parameters and corresponding numerical ranges for those parameters in accordance with the present invention;

FIG. 8 illustrates an original element pattern (solid lines) and an overlay element pattern (dashed lines) representing a replacement pattern to eliminate an element edge that is below the minimum size threshold; and FIG. 9 illustrates a variety of original tria and quad elements having at least one edge that is too large. In each case, an example substitute pattern is overlayed.

DETAILED DESCRIPTION OF THE PREFERRED EMBODIMENTS

Method Overview

Figure 3A:
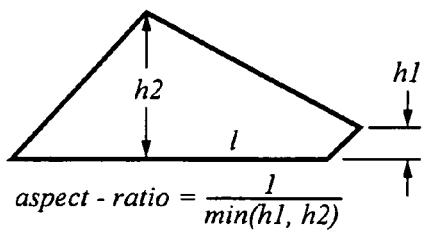
FIGS. 3a–3c illustrate methods and corresponding algorithms for calculating various element pattern quality parameters in accordance with the present invention.

FIG. 1 is a block flow diagram illustrating a preferred methodology for implementing the present invention. Notably, the content and arrangement of items illustrated in FIG. 1 may be rearranged or adapted to best fit a particular implementation of the present invention. As represented in block 10, an original finite element mesh is received in an electronic format. Electronic file formats for finite element meshes include NASTRAN and RADIOSS. As represented in block 12, the finite element mesh is pre-processed in a computer-automated fashion. This aspect of the present invention is described in greater detail below. As represented in block 14, the mesh is optimized utilizing a computer-implemented optimization algorithm described in greater detail below. As represented in block 16, the optimized mesh is output in an electronic format.

Mesh Preprocessing

In accordance with a preferred embodiment of the present invention, original mesh preprocessing or base preparation may be implemented prior to evaluating mesh quality and replacing mesh element patterns to improve mesh quality, as discussed in greater detail below. Mesh preprocessing routines include removing duplicate elements, identifying hard points, removing sliver elements, removing tiny elements, creating border lines, removing duplicate nodes along border lines, removing duplicate nodes along elements, closing gaps in the mesh, closing small holes in the mesh, creating feature lines, deleting close feature lines, etc.

Removing duplicate elements involves checking a finite element mesh for two elements having the same component nodes and part of the same part. Where this occurs, one of the two elements are deleted.

Identifying hard points involves checking a finite element mesh for weld points and identifies them as hard points. A weld point is a node that is a connection between parts, including through a rigid joint or spring. Once a node is identified as a hard point, it should not be moved nor deleted.

Removing tiny elements involves collapsing the short edges of elements having a edge that is below a minimum element size value. Other size thresholds may include "goal" and "maximum". This collapsing process merges two nodes into one. Typically, this step results in the deletion of a tria or the conversion of a quad to a tria.

A border line marks the edge of a mesh and also marks the boundary between two parts or elements with other attributes. These attributes may represent an element's physical definition. Such attributes may include different thicknesses or membership in different contact groups. Border lines keep attribute boundaries distinct. They are usually created by scanning the mesh for element edges along which the element has no neighbor or has a neighbor with different attributes. These edges are marked as border segments. These segments are then connected into border lines.

Removing sliver elements involves removing trias having an aspect ratio beyond an extreme value such as $1/50$, or $1/100$. An acceptable value is usually $1/10$. Preferably, an aspect ratio for each tria within a mesh is calculated to determine whether the ratio beyond the threshold. If this occurs, the surrounding element pattern is evaluated to determine whether the tria can be switched with a neighbor element pattern. This switching step considers the neighbor element along the tria's long edge. If a switch is possible, both the bad element and its neighbor are deleted and new elements are created with a different joining edge.

Mesh Optimization

FIG. 2 is a block flow diagram illustrating a preferred methodology for optimizing a finite element mesh in accordance with the present invention. Notably, the content and arrangement of items illustrated in FIG. 2 may be rearranged or adapted to best fit a particular implementation of the present invention.

As represented in block 18, threshold values for one or more mesh quality parameters are defined. Mesh pattern quality parameters include but are not limited to minimum size, maximum size, optimal size, warping, skewing, aspect ratio, taper and distortion. In one embodiment of the present invention, two quality threshold values are defined for each parameter: one defining the threshold between failing quality values and acceptable quality values, and another defining the threshold between acceptable quality values and good quality values.

As represented in block 20, a quality analysis of the original mesh is performed. Output from the quality analysis may include the total number of mesh elements, the number of bad/failing, good/acceptable and best elements for each quality parameter and an overall quality score for the mesh. Mesh and individual element quality values may be calculated based upon one or more of the quality parameters defined in block 18. Where more than one quality parameter is considered in the calculation, the quality score for each element and/or the overall quality score may be computed as an average quality score based on a quality score for each parameter. Notably, depending on the nature of the quality parameters, the quality thresholds may be approached from above (i.e., where a lower quality value is preferred) or from below (i.e., where a higher quality value is preferred).

Element quality scores may be calculated with different computational methods. For example, skew can be calculated with the NASTRAN method. The aspect ratio parameter may be calculated using the standard quad aspect ratio, the NASTRAN quad aspect ratio, and the Vflex quad aspect ratio.

A ROCK method for calculating quad aspect ratio involves calculating the sum of the lengths of opposite sides of the quad and dividing the larger sum by the smaller sum. A perpendicular method for calculating quad aspect ratio involves dividing the length of the longest side of the quad into the length of the quad's shortest perpendicular. FIG. 3a illustrates the perpendicular method and corresponding aspect ratio equation.

Figure 3B:
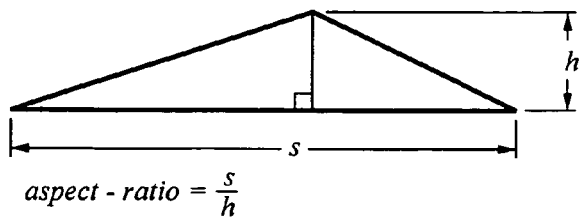

In a ROCK method for calculating tria aspect ratios, the length of the tria's height is divided into the length of the longest side of the tria. FIG. 3b illustrates the ROCK method and corresponding aspect ratio equation.

Figure 3C:
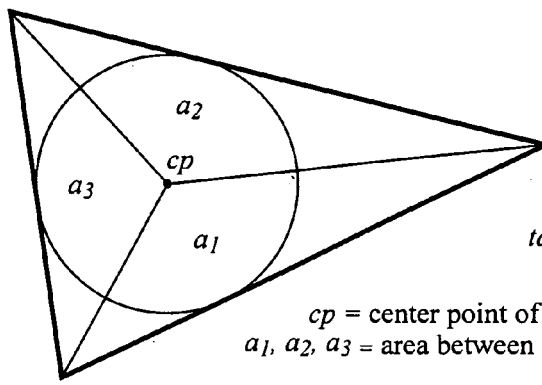

For trias, the taper parameter may be calculated using a ROCK tria taper method. In this method, tria taper is computed by finding the center of an inscribed circle and drawing lines from the center of the circle to the nodes of the element, and dividing the element into three parts. The area of each part is calculated and the smallest area is divided by the area of the whole element. The resulting value is multiplied by a constant such as 0.75. Other constants may be utilized. FIG. 3c illustrates the ROCK method and corresponding taper equation.

As represented in block 22, elements that fall below the predefined minimum size threshold are identified and processed. Identifying elements that are too small involves tagging each element pattern having an edge smaller than the predefined size threshold. A node on the smallest edge of each tagged element pattern may then be smoothed. Typically, this will result in the edges of the element pattern falling within the acceptable size threshold(s).

If an edge of the resulting pattern is still too small, however, replacement patterns may be created. To create replacement patterns, the short edge is collapsed to a node. Typically, a quad element along the short edge will become a tria. A tria element along the short edge will typically be deleted. In addition to the elements on either side of the short edge, elements that use one of the nodes of the short edge may also be affected. Following the collapse, three new element patterns may be created: two having a collapse point at each end of the short edge and one having a collapse point at the short edge's midpoint. Next, the three replacement patterns are analyzed and their relative quality scores are calculated. The replacement pattern having the best quality score is substituted for the original pattern in the mesh. FIG. 8 illustrates an original element pattern (solid lines) and an overlay element pattern (dashed lines) representing a replacement pattern to eliminate an element edge that is below the minimum size threshold.

Figure 4:
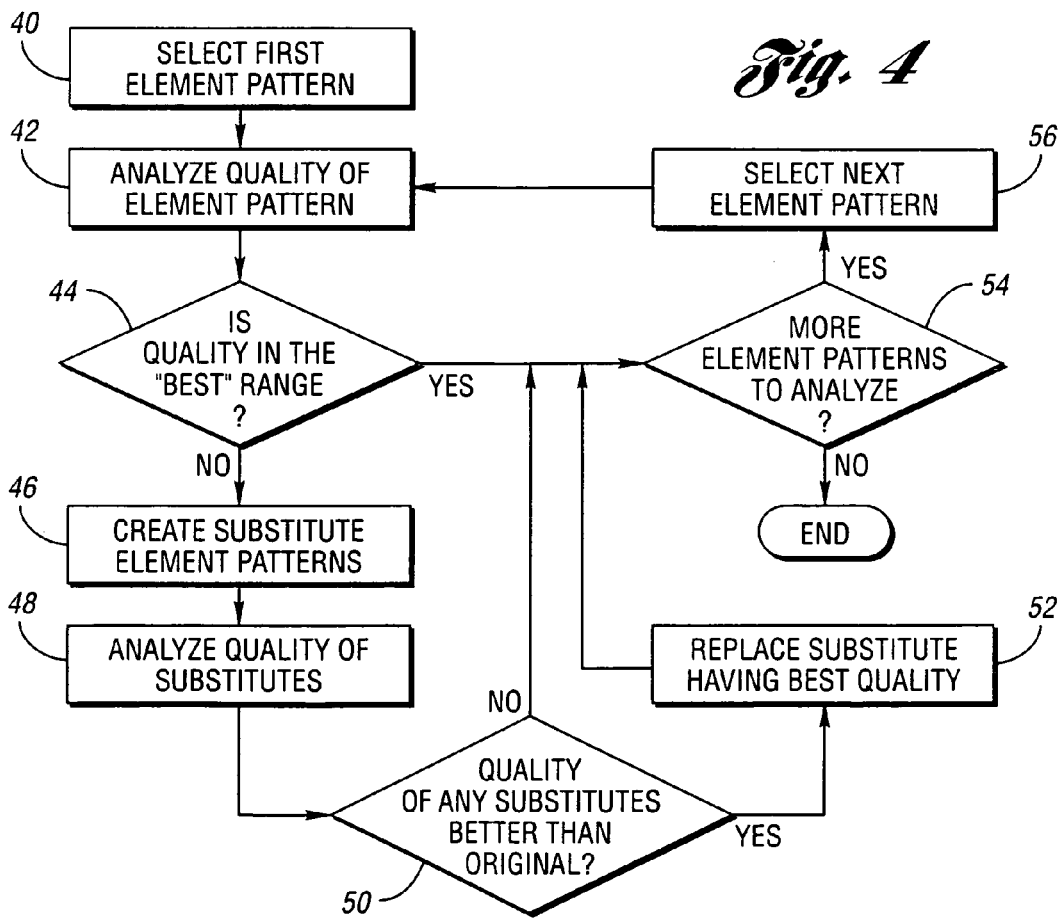
FIG. 4 is a more detailed block flow diagram illustrating aspects of a preferred methodology for optimizing a finite element mesh in accordance with the present invention.

As represented in block 24, the mesh is optimized for quality based upon one or more of the predefined quality parameters. FIG. 4 is a block flow diagram illustrating a preferred methodology for optimizing mesh quality. Notably, the content and arrangement of items illustrated in FIG. 4 may be rearranged or adapted to best fit a particular implementation of the present invention.

As represented in block 40, a first element pattern is selected. An element pattern typically comprises a single mesh or an element and one or more of its adjacent neighbor elements, a node and the elements around that node, or a collapse along one edge of a tria or across the diagonal of a quad. In the collapse, all elements around both of the remaining nodes may be considered. Notably, there are unlimited number of node-edge-element combinations that may make up an element pattern.

Figure 5A:
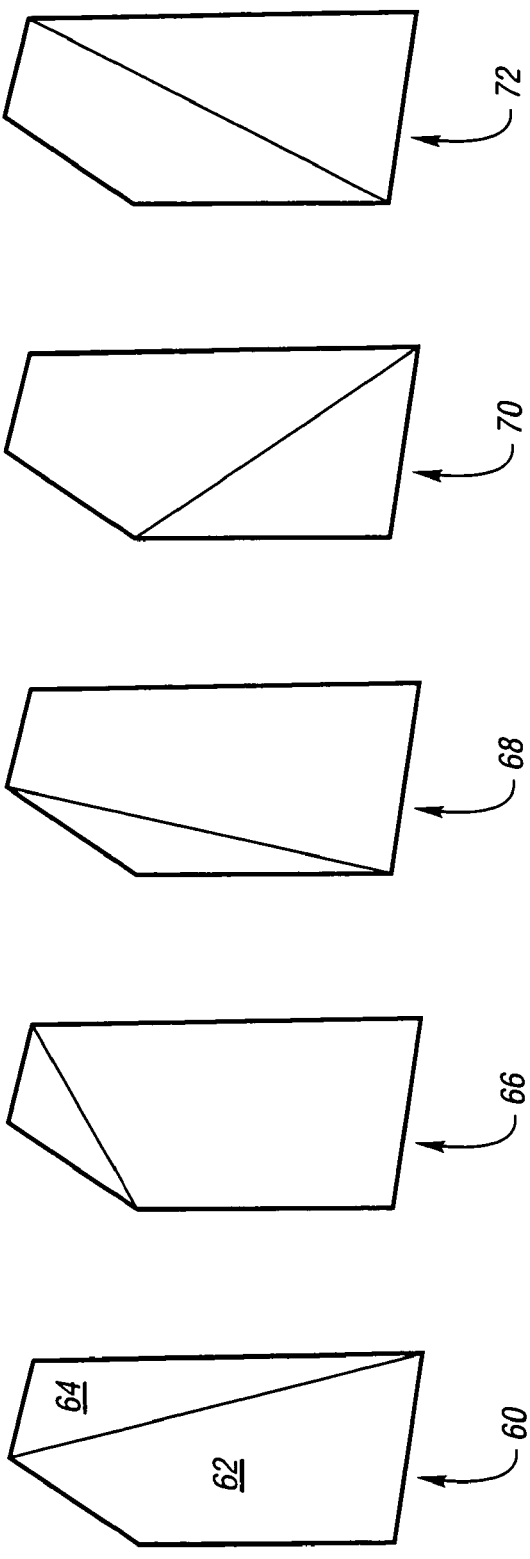
FIGS. 5a–5b illustrate example substitute element patterns created in accordance with the present invention.
Figure 5B:
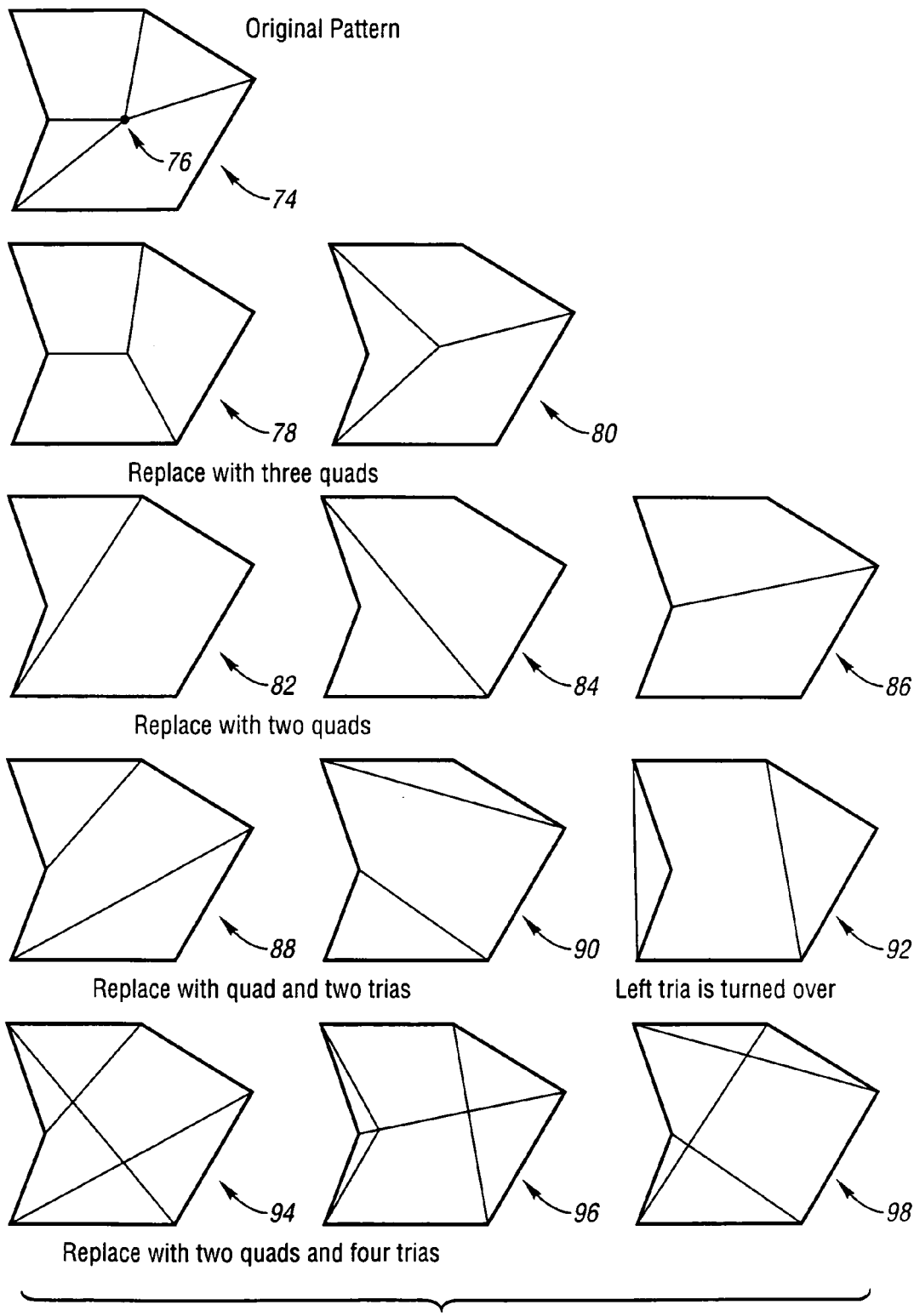

As represented in block 42, a quality score for a first element pattern is calculated based upon a combination of quality parameters. If the quality score for the element pattern is within the bad/failing or good/acceptable quality range, substitute patterns for that element pattern may be created, as represented in block 46. The number of substitute element patterns may be defined based upon the geometry of the original element pattern. As illustrated in FIG. 5a for example, if the original pattern 60 includes a quad 62 and an adjacent tria 64, there are four possible substitute element patterns (66–72). Each substitute pattern has a tria in a different position within the five node ring. FIG. 5b illustrates another example where the original pattern 74 constitutes a node 76 surrounded by a six node ring. In this example, there are eleven possible substitute patterns (78–98). Depending on the original element pattern, a large number of substitute patterns may be created.

Referring again to FIG. 4, a quality score for each of the substitute patterns is calculated as represented in block 48 based upon the predefined parameters. As represented in block 50, the quality score for each of the substitute element patterns is compared to the quality score of the original element pattern. If the quality score for any of the substitute element patterns is better than the quality score of the original element pattern, the original element pattern is replaced with the substitute pattern having the best quality score, as represented in block 52. Otherwise, no replacement takes place and the next element pattern in the mesh is selected for analysis, as represented in blocks 54 and 56. The replacement is preferably rejected in instances where the substitute pattern has turnover elements—element pattern whose normal is in the opposite direction of the normal of the original element pattern. This scenario can occur in both trias and quads. The replacement pattern is also preferably rejected in instances where twisted elements exist. A twisted element pattern is a quad that is extremely warped—one in which normals from opposite corners go in opposing directions. Preferably, the existence of twist or turnover influences the quality score. Preferably, the mesh optimization process continues until all element patterns within the mesh are analyzed.

Referring again to FIG. 2, elements that are larger than the predefined maximum element length are identified and processed, as represented in block 26. Identifying elements that are too large involves tagging each element pattern edge that is larger than the predefined size threshold or more than twice the optimal size. Once the large element edges have been identified, a node is created in the middle of each edge that is too large. The elements that include these edges are individually classified according to how many of its edges have middle nodes. For example, a tria may have one, two, or three edges with middle nodes. A quad may have one, two, three, or four edges with a middle node. In addition, if there are two such edges, the quad element is classified as to whether they are on adjacent or opposite sides. If a tria element has two edges with mid-nodes on either side of a small angle, the pattern is handled separately by assigning the same node to be the mid-node of both edges, which has the effect of collapsing out the point of the element. FIG. 9 illustrates a variety of original tria and quad elements having at least one edge that is too large. In each case, an example substitute pattern is overlayed.

Because a tria typically has only one substitute pattern for each classification, the original element may be replaced with the substitute pattern. Because quad patterns typically have more than one substitute pattern, a quality score for each substitute must be calculated and compared to determine the substitute pattern having the best quality score. This is the pattern that replaces the original element pattern. Preferably, a long edge on a border or feature line is replaced with two edges, preserving the line.

As represented in block 28, the mesh is again optimized for quality. This process, as discussed in detail above, is illustrated in FIG. 4. Following this mesh optimization process, nodes on the mesh are preferably smoothed, as represented in block 30. A variety of smoothing methods are known and most are suitable for performing this step. In accordance with a preferred embodiment of the present invention, a separate quality score is calculated for each smoothing iteration for a given node. The quality scores are then compared to identify the smoothing iteration for that node having the highest quality score based upon the predefined quality parameters. This is the smoothing iteration that is implemented in the mesh for that node.

As represented in block 32, the overall mesh quality and/or element count is recalculated and compared to the quality and/or element count of the original mesh computed at block 20. Preferably, the mesh optimization routine is repeated where the mesh quality and/or element quantity increase is greater than a predefined improvement threshold (e.g., 10%, 20%, etc.).

In one embodiment, the optimization process cycles through the loop again if the elements too big process created a large number of elements (more than a 10% change) or if the overall quality score changed a lot (more than a 10% change). Notably, if the operation is coarsening, the number of elements is expected to decrease. If the operation is refinement, the number of elements is expected to increase. Since the elements too big process typically splits long edges in half, it may require several split operations to bring the elements to the proper size. If the overall mesh quality changed a lot it may suggest that operations done in one pass may leave behind patterns which would be resolved in another pass.

Referring again to FIG. 1, the optimized mesh may be output in one or more electronic file formats including but not limited to NASTRAN, RADIOSS, etc.

Computer Implementation

In other embodiments of the present invention, methodologies such as those illustrated and described with respect to FIGS. 1–5 may be executed electronically in a computer environment. The application may be run on a PC or work station having sufficient memory to timely process and optimize the finite element mesh. Programming to host the present invention may be implemented with C and/or C++programming languages. Other programming languages may utilized, however. FIG. 6 is an example graphical user interface (GUI) for activating/deactivating quality parameters and defining corresponding quality thresholds for an analysis or optimization of a finite element mesh, as discussed in greater detail above. For one or more quality parameters (i.e., warping, skewing, aspect ratio, etc.), a user defines a computation method (i.e., standard, interior angle, rock, etc.) for quad and tria elements. For each of the selected quality parameters, quality thresholds are defined. In one embodiment of the present invention, a bad/failing and good/acceptable quality threshold value is defined for each quality calculation method to be used in the analysis/optimization. Depending on the nature of the quality parameter, a value input into a "good" field may be higher or lower than a value input into a corresponding "bad" field. Default methods and/or values may be predefined. Default methods and/or values may be predefined according to the nature of the original finite element mesh, or a desired optimized mesh.

Figure 7:
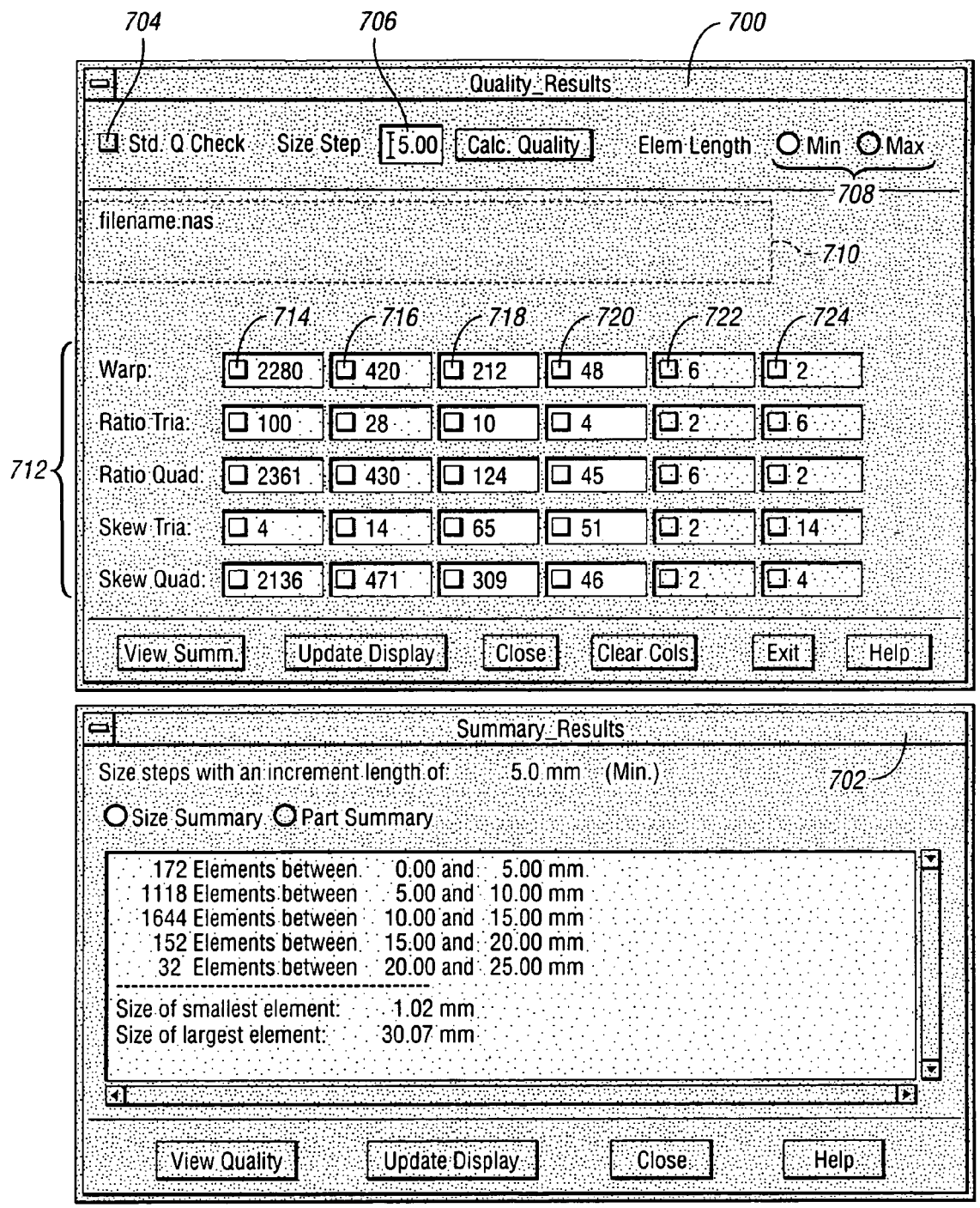
FIG. 7 is an example graphical user interface (GUI) for outputting mesh and element pattern quality statistics for a finite element mesh being analyzed based upon one or more quality parameters in accordance with the present invention.

FIG. 7 is an example GUI for outputting the results of a mesh quality analysis or optimization, as discussed in greater detail above.

In the quality results window 700, user functionality includes an option 704 to implement a standard quality check, a field 706 for defining an element length step, and an option 708 for toggling between a minimum or a maximum element length analysis. Region 710 may present the file name/location of the current mesh, an overall quality grade for the current mesh, the total number of mesh elements, the percentage of those elements that are trias, etc.

An overall mesh quality grade can be calculated in a variety of different manners within the scope of the present invention. In one example, a quality score is calculated for each of the specified quality parameters. Each of those scores are then compared to their corresponding threshold values. If a score is better than halfway between the good threshold value and the highest possible score, then the grade is 1. If the value is between the good threshold but less than that halfway point, it is given a grade of 2. In a similar manner, a grade of 4 is given to those with an acceptable value, 8 for a tolerable value, 16 for a failing value, and 32 for the worst value. In some cases, a value falling between thresholds may be given an intermediate grade. For example, a value that is a bit better than halfway between good and bad thresholds may be given a grade of 7 instead of making an abrupt change from a grade of 4 to 8. The quality scores may be normalized against the threshold values on an exponential scale. If a quad element is better than the good threshold, it may be tallied as being "great". Typically, trias are not considered to be great. If any element is worse than the bad threshold, it may be tallied as "worst". Once the quality score for each quality parameter has been converted to a grade (i.e., from 1 to 32), the grades are averaged to produce the overall quality score. Because tria elements are less desirable than quads, their score may be multiplied by a weighting factor such as 3 or 5. Preferably, a check for twist and turnover is performed and such faults are tallied as well. Finally, the individual element scores may be averaged to arrive at an overall quality score for the mesh. The "great", "worst", and "fault" tallies may also be factored into the overall score. Notably, this is only one example of how the overall mesh quality grade can be calculated. An unlimited number of possibilities exist, however, to calculate such a score within the scope of the present invention.

In region 712, the interface outputs the number of mesh elements falling within the user-defined threshold ranges for each selected quality parameter. For example, FIG. 6 illustrates that a user has defined quality thresholds for quad warping to be 3 for good/acceptable and 15 for bad/failing. Referring again to FIG. 7, and continuing with the current example, region 714 outputs the number of mesh elements having a warp value between 0 (best possible score) and 1.5 (halfway to the good/acceptable threshold). These elements are classified as very good. Region 716 outputs the number of mesh elements having a warp value from 1.5 to 3 (the good/acceptable threshold). These elements are classified as good/acceptable. Region 718 outputs the number of mesh elements having a warp value from 3 to 9 (9 is halfway between the good/acceptable and bad/failing thresholds). These elements are classified as good/acceptable. Region 720 outputs the number of elements having a warp value from 9 to 15 (the bad/failing threshold) and classifies them as tolerable. Region 722 outputs the number of mesh elements having a warp value from 15 to 21 (the same step size as used for halfway between good and bad thresholds) and are classified as bad/failing. Region 724 outputs the number of elements having a warp value beyond 21 and are classified as worst.

By selecting one of the regions (i.e., 724), a user is presented with a menu (not shown) at which a user can select one or more of the elements or element groups within that quality range and be presented with a visual representation of the mesh showing the selected element or element group.

Referring now to the "Summary-Results" window 702, a user is presented with a listing 726 categorizing the number of elements falling within the user-defined size increments 706. Preferably, the shortest and longest element lengths are output as well, as represented in region 728.

While the best mode for carrying out the invention has been described in detail, those familiar with the art to which this invention relates will recognize various alternative designs and embodiments for practicing the invention as defined by the following claims.

What is claimed is:

1. A computer-implemented base preparation method for a finite element mesh, the method comprising:

receiving a finite element mesh in an electronic format;

removing one or more of any duplicate elements from the finite element mesh;

identifying one or more of any hard points in the finite element mesh;

removing one or more of any sliver elements from the finite element mesh;

creating one or more border lines for the finite element mesh;

removing one or more of any duplicate nodes along one or more of the border lines; and removing one or more of any duplicate nodes along one or more elements in the finite element mesh.

2. A system for base preparation of a finite element mesh, the system including a computing device operably configured to:

receive a finite element mesh in an electronic format;

remove one or more of any duplicate elements from the finite element mesh;

identify one or more of any hard points in the finite element mesh;

remove one or more of any sliver elements from the finite element mesh;

create one or more border lines for the finite element mesh;

remove one or more of any duplicate nodes along one or more of the border lines; and remove one or more of any duplicate nodes along one or more elements in the finite element mesh.

* * * * *